United States Patent
Sato et al.

(10) Patent No.: US 10,879,560 B2
(45) Date of Patent: *Dec. 29, 2020

(54) ACTIVE MATERIAL AND ALL-SOLID-STATE LITHIUM-ION SECONDARY BATTERY

(71) Applicant: TDK CORPORATION, Tokyo (JP)

(72) Inventors: Hiroshi Sato, Tokyo (JP); Masahiro Oishi, Tokyo (JP); Haruna Kato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/333,039

(22) PCT Filed: Sep. 25, 2017

(86) PCT No.: PCT/JP2017/034474
§ 371 (c)(1),
(2) Date: Mar. 13, 2019

(87) PCT Pub. No.: WO2018/062079
PCT Pub. Date: Apr. 5, 2018

(65) Prior Publication Data
US 2019/0207254 A1    Jul. 4, 2019

(30) Foreign Application Priority Data

Sep. 29, 2016   (JP) .................................. 2016-192081

(51) Int. Cl.
*H01M 4/13*   (2010.01)
*H01M 10/0562*   (2010.01)
(Continued)

(52) U.S. Cl.
CPC .......... *H01M 10/0562* (2013.01); *H01B 1/06* (2013.01); *H01B 1/08* (2013.01);
(Continued)

(58) Field of Classification Search
CPC ......... H01M 10/0562; H01M 10/0525; H01M 4/36; H01M 4/505; H01M 4/525; H01M 4/58; H01M 2004/021
See application file for complete search history.

(56) References Cited

U.S. PATENT DOCUMENTS

2007/0202400 A1   8/2007   Yoshida et al.
2013/0093130 A1   4/2013   Yada et al.
(Continued)

FOREIGN PATENT DOCUMENTS

JP   2003-272623 A   9/2003
JP   2012-094407 A   5/2012
(Continued)

OTHER PUBLICATIONS

Nov. 7, 2017 Search Report issued in International Patent Application No. PCT/JP2017/034474.
(Continued)

*Primary Examiner* — Jane J Rhee
(74) *Attorney, Agent, or Firm* — Oliff PLC

(57) ABSTRACT

An active material according to one aspect of the present invention includes a core region; and a shell region, in which an amount of transition metals in the core region is more than an amount of transition metals in the shell region, and an amount of oxygen deficiency in the shell region is more than an amount of oxygen deficiency in the core region.

19 Claims, 4 Drawing Sheets

(51) Int. Cl.
  *H01M 10/0525* (2010.01)
  *H01M 4/525* (2010.01)
  *H01M 4/505* (2010.01)
  *H01B 1/06* (2006.01)
  *H01M 10/052* (2010.01)
  *H01B 1/08* (2006.01)
  *H01M 4/58* (2010.01)
  *H01M 4/36* (2006.01)
  *H01M 4/02* (2006.01)

(52) U.S. Cl.
  CPC .............. *H01M 4/36* (2013.01); *H01M 4/505* (2013.01); *H01M 4/525* (2013.01); *H01M 4/58* (2013.01); *H01M 10/052* (2013.01); *H01M 10/0525* (2013.01); *H01M 2004/021* (2013.01)

(56) References Cited

U.S. PATENT DOCUMENTS

2013/0330616 A1  12/2013  Christensen
2014/0045067 A1* 2/2014  Cho ................. H01M 4/485
                                              429/220
2014/0065481 A1  3/2014  Yoshida et al.
2018/0053936 A1  2/2018  Sato et al.

FOREIGN PATENT DOCUMENTS

| JP | 5115920 B2 | 1/2013 |
| JP | 2014-049195 A | 3/2014 |
| JP | 2014-505992 A | 3/2014 |
| WO | 2012/001808 A1 | 1/2012 |
| WO | 2016/139957 A1 | 9/2016 |

OTHER PUBLICATIONS

Nov. 7, 2017 International Search Report issued in International Patent Application PCT/JP2017/034482.
U.S. Appl. No. 16/335,609, filed Mar. 21, 2019 in the name of Sato et al.

* cited by examiner

ACTIVE MATERIAL AND ALL-SOLID-STATE LITHIUM-ION SECONDARY BATTERY

TECHNICAL FIELD

The present invention relates to an active material and an all-solid-state lithium-ion.

Priority is claimed on Japanese Patent Application No. 2016-192081, filed Sep. 29, 2016, the content of which is incorporated herein by reference.

BACKGROUND ART

In recent years, batteries have been used for various purposes. Batteries are also used in, for example, portable batteries and the like. Therefore, a reduction in size and weight, a reduction in thickness, and improvement in reliability are required. Batteries formed of an electrolytic solution have problems such as liquid leakage which is a cause of ignition. Accordingly, attention has been drawn to an all-solid-state-type lithium-ion secondary battery formed of a solid electrolyte. For example, Patent Literature 1 discloses a polyanion-based all-solid-state lithium-ion secondary battery with a predetermined composition.

Meanwhile, all-solid-state lithium-ion secondary batteries have a problem that output is small as compared with batteries formed of an electrolytic solution. Accordingly, it is required to increase a Li diffusion rate and electron conductivity of all-solid-state lithium-ion secondary batteries.

For example, Patent Literature 2 discloses a positive electrode active material for a non-aqueous electrolyte secondary battery having a core-shell structure. An active material has a core portion, and a shell portion that coats the core portion and contains a predetermined amount or more of carbon, thereby increasing electron conductivity of the non-aqueous electrolyte secondary battery.

In addition, for example, Patent Literature 3 discloses an active material for a non-aqueous electrolyte secondary battery, which has a core body, and a shell body having an olivine structure. With the shell body has a stable olivine structure, lithium can stably transfer at the time of charging and discharging. As a result, cycle characteristics of the battery are improved.

CITATION LIST

Patent Literature

[Patent Literature 1]
  Japanese Patent No. 5115920 (B)
[Patent Literature 2]
  Japanese Unexamined Patent Application, First Publication No. 2014-49195 (A)
[Patent Literature 3]
  Japanese Unexamined Patent Application, First Publication No. 2012-94407 (A)

SUMMARY OF INVENTION

Technical Problem

However, the batteries disclosed in Patent Literature 1 to 3 have a problem that a high capacity regarding a battery capacity and a reduction in internal resistance cannot be realized at the same time.

The all-solid-state lithium-ion secondary battery disclosed in Patent Literature 1 has poor electron conductivity and thus an internal resistance cannot be sufficiently reduced.

The active material having the core-shell structure disclosed in Patent Literature 2 can increase electron conductivity. However, carbon does not contribute to the transfer of electrons as the active material does, and therefore a battery capacity lowers.

The active material having the core-shell structure disclosed in Patent Literature 3 merely stabilizes the transfer of electrons and cannot improve electron conductivity.

The present invention has been made in view of the above problems, and an object thereof is to provide an all-solid-state lithium-ion secondary battery in which a capacity is high and an internal resistance can be reduced. Another object is to provide an active material having high capacity and excellent conductivity in order to provide such an all-solid-state lithium-ion secondary battery.

Solution to Problem

The inventors of the present invention have found that, when a core region and a shell region satisfy predetermined conditions, both the core region and the shell region can function as active material pieces, and electron conductivity can be improved.

In other words, the following means are provided to achieve the above-described objects.

An active material according to one aspect of the present invention includes a core region; and a shell region, in which an amount of transition metals in the core region is more than an amount of transition metals in the shell region, and an amount of oxygen deficiency in the shell region is more than an amount of oxygen deficiency in the core region.

In the active material according to the above-described aspect, the transition metals may be at least one selected from the group consisting of V, Mn, Co, Ni, Fe, Ti, Cu, Cr, Nb, and Mo.

In the active material according to the above-described aspect, the shell region may contain Ti.

In the active material according to the above-described aspect, a Ti content in the shell region may be more than a Ti content in the core region.

In the active material according to the above-described aspect, the core region may contain 10 to 40 wt % of V, and the shell region may contain 0.1 to 15 wt % of Ti.

In the active material according to the above-described aspect, an average particle size Pc of a core portion including the core region and a thickness Ps of a shell portion including the shell region may satisfy a relationship of $0.4 \leq Pc/(2Ps+Pc) \leq 0.98$.

In the active material according to the above-described aspect, the core portion including the core region and the shell portion including the shell region may form a solid solution.

An all-solid-state lithium-ion secondary battery according to one aspect of the present invention includes a pair of electrodes that contain the active material according to the above aspect, and a solid electrolyte that is sandwiched between the pair of electrodes.

In the all-solid-state lithium-ion secondary battery according to the above-described aspect, the core region of the active material, the shell region of the active material, and the solid electrolyte may contain identical elements.

In the all-solid-state lithium-ion secondary battery according to the above-described aspect, the core region of the active material, the shell region of the active material, and the solid electrolyte may satisfy a general formula (1) below, $Li_aV_bAl_cTi_dP_eO_{12-x}$ (1), $0.5 \leq a \leq 3.0$, $1.2 < b \leq 2.0$, $0.01 \leq c < 0.06$, $0.01 \leq d < 0.60$, $2.8 \leq e \leq 3.2$, and $0 \leq x < 12$ may be satisfied in the core region, $0.5 \leq a \leq 3.0$, $1.0 \leq b \leq 1.2$, $0.06 \leq c \leq 0.09$, $0.6 \leq d \leq 1.4$, $2.8 \leq e \leq 3.2$, and $0 \leq x < 12$ may be satisfied in the shell region, and $0.5 \leq a \leq 3.0$, $0.01 \leq b < 1.0$, $0.09 < c \leq 0.30$, $1.4 < d \leq 2.0$, $2.8 \leq e \leq 3.2$, and $0 \leq x < 12$ may be satisfied in the solid electrolyte.

In the all-solid-state lithium-ion secondary battery according to the above-described aspect, $0.8 \leq a \leq 3.0$, $1.2 < b \leq 2.0$, $0.01 \leq c < 0.06$, $0.01 \leq d < 0.60$, $2.9 \leq e \leq 3.1$, and $0 \leq x < 12$ may be satisfied in the core region, $0.8 \leq a \leq 3.0$, $1.0 \leq b \leq 1.2$, $0.06 \leq c \leq 0.09$, $0.6 \leq d \leq 1.4$, $2.9 \leq e \leq 3.1$, and $0 \leq x < 12$ may be satisfied in the shell region, and $0.8 \leq a \leq 3.0$, $0.01 \leq b < 1.0$, $0.09 < c \leq 0.3$, $1.4 < d \leq 2$, $2.9 \leq e \leq 3.1$, and $0 \leq x < 12$ may be satisfied in the solid electrolyte.

In the all-solid-state lithium-ion secondary battery according to the above-described aspect, a pair of electrode layers and a solid electrolyte layer provided between the pair of electrode layers may have a relative density of 80% or more.

Advantageous Effects of Invention

According to the active material according to one aspect of the present invention, it is possible to increase a battery capacity and reduce an internal resistance of the all-solid-state lithium-ion secondary battery.

DESCRIPTION OF EMBODIMENTS

Figure 1:
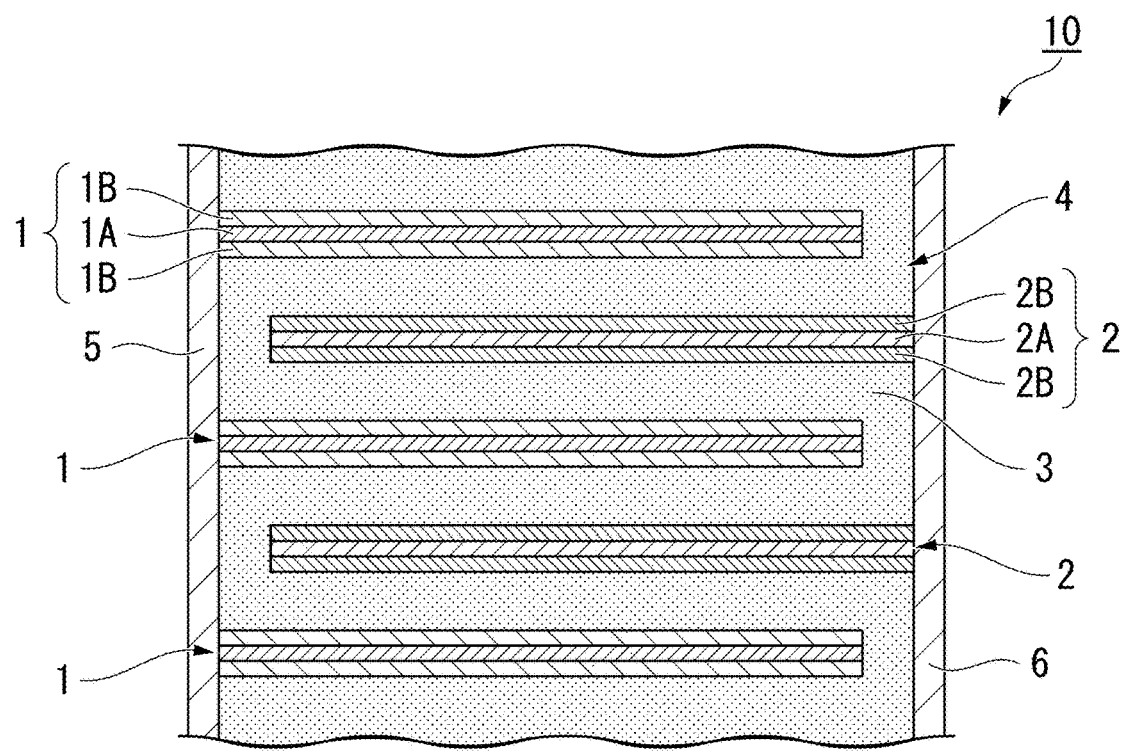
FIG. 1 is a cross-sectional schematic view showing an enlarged main part of an all-solid-state lithium-ion secondary battery according to an embodiment.

Hereinafter, the present embodiment will be described in detail with reference to the drawings as appropriate. In the drawings used in the following description, a main part is shown in an enlarged manner in some cases for the sake of convenience in order to make the features of the present embodiment easy to understand, and dimensional ratios and the like between the components may be different from actual ratios. The materials, dimensions, and the like exemplified in the following description are merely examples, and the present embodiment is not limited thereto, and can be appropriately changed and modified to carry out the present embodiment, within a range not changing the gist thereof.

FIG. 1 is a cross-sectional schematic view showing an enlarged main part of an all-solid-state lithium-ion secondary battery according to the present embodiment. As shown in FIG. 1, an all-solid-state lithium-ion secondary battery 10 includes a laminate 4 having first electrode layers 1, second electrode layers 2, and a solid electrolyte 3.

Each of the first electrode layers 1 is connected to a first external terminal 5, and each of the second electrode layers 2 is connected to a second external terminal 6. The first external terminal 5 and the second external terminal 6 are electrical contact points with respect to the outside.

(Laminate)

The laminate 4 has the first electrode layers 1, the second electrode layers 2, and the solid electrolyte 3. One of the first electrode layer 1 and the second electrode layer 2 functions as a positive electrode, and the other functions as a negative electrode. The polarity of the electrode layer changes depending on which polarity is connected to the external terminal. Hereinafter, in order to facilitate understanding, the first electrode layer 1 will be referred to as a positive electrode layer 1, and the second electrode layer 2 will be referred to as a negative electrode layer 2.

In the laminate 4, the positive electrode layer 1 and the negative electrode layer 2 are alternately laminated with the solid electrolyte 3 therebetween. The all-solid-state lithium-ion secondary battery 10 is charged and discharged due to exchange of lithium ions between the positive electrode layer 1 and the negative electrode layer 2 via the solid electrolyte 3.

"Positive Electrode Layer and Negative Electrode Layer"

The positive electrode layer 1 has a positive electrode current collector 1A, and a positive electrode active material layer 1B containing a positive electrode active material. The negative electrode layer 2 has a negative electrode current collector 2A, and a negative electrode active material layer 2B containing a negative electrode active material.

It is preferable that the positive electrode current collector 1A and the negative electrode current collector 2A have high electrical conductivity. For this reason, it is preferable to use, for example, silver, palladium, gold, platinum, aluminum, copper, nickel, or the like for the positive electrode current collector 1A and the negative electrode current collector 2A. Among these materials, copper hardly reacts with a positive electrode active material, a negative electrode active material, and a solid electrolyte. Accordingly, when copper is used for the positive electrode current collector 1A and negative electrode current collector 2A, it is possible to reduce an internal resistance of the all-solid-state lithium-ion secondary battery 10. Materials constituting the positive electrode current collector 1A and the negative electrode current collector 2A may be the same as or different from each other.

The positive electrode active material layer 1B is formed on one surface or both surfaces of the positive electrode current collector 1A. For example, there is no negative electrode layer 2 facing a positive electrode layer 1 which is located at the uppermost layer in a lamination direction of the all-solid-state lithium-ion secondary battery 10. Accordingly, in the positive electrode layer 1 located at the uppermost layer of the all-solid-state lithium-ion secondary battery 10, the positive electrode active material layer 1B may be provided only on one side which is a lower side in the lamination direction. The same applies to the negative electrode active material layer 2B as the positive electrode active material layer 1B in that it is formed on one or both surfaces of the negative electrode current collector 2A.

Each of the positive electrode active material layer 1B and the negative electrode active material layer 2B contains a positive electrode active material or a negative electrode active material which exchanges electrons with lithium ions. In addition, a conductive auxiliary agent or the like may be contained therein. It is preferable that lithium ions be efficiently inserted into and desorbed from the positive electrode active material and negative electrode active material.

The active material pieces constituting the positive electrode active material layer 1B or the negative electrode active material layer 2B are not clearly distinguished. By comparing the potentials of the two kinds of compound, it is possible to use a compound showing a nobler potential as the positive electrode active material, and to use a compound showing a more base potential as a negative electrode active material. Therefore, hereinafter, the active material will be described collectively.

Figure 2:
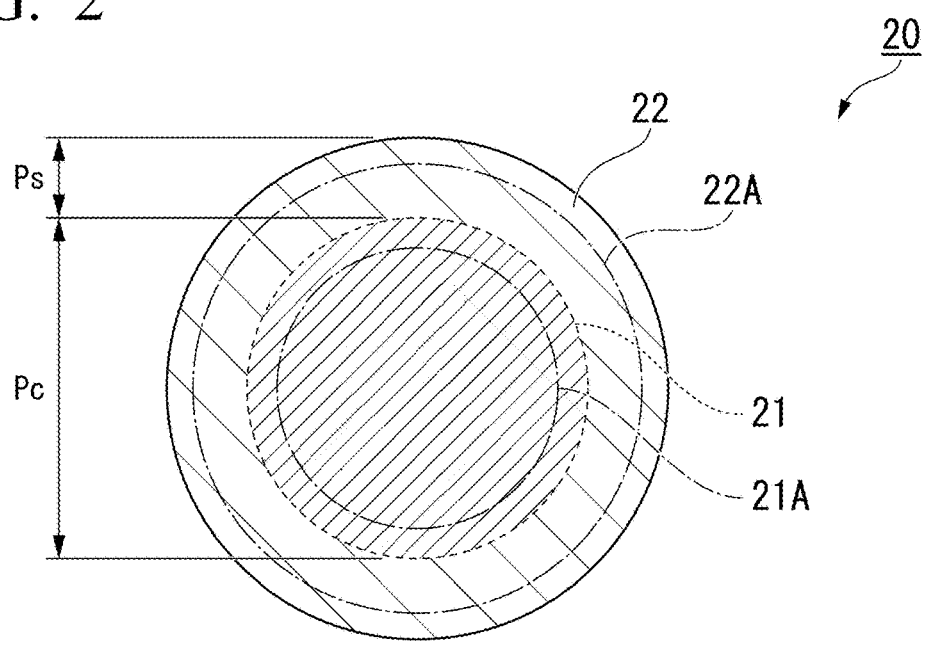
FIG. 2 is a cross-sectional schematic view of an active material in the present embodiment.

FIG. 2 is a cross-sectional schematic view of the active material in the present embodiment. An active material 20 has a core portion 21 and a shell portion 22. The core portion 21 is present as a central portion of the active material 20 with respect to the shell portion 22. The shell portion 22 is on an outer peripheral side of the core portion 21 to cover the core portion 21. The shell portion 22 does not need to completely cover the core portion 21, and the core portion 21 may be partially exposed.

Both the core portion 21 and the shell portion 22 contain materials capable of functioning as batteries. In other words, lithium ions which are conductive carriers can be inserted into and desorbed from both the core portion 21 and the shell portion 22.

It is preferable that the core portion 21 and the shell portion 22 form a solid solution. With the core portion 21 and the shell portion 22 form a solid solution, adhesiveness can be improved, and contact resistance at an interface can be prevented from becoming large. In other words, it is possible to prevent an increase in internal resistance of the all-solid-state lithium-ion secondary battery 10.

In a case where the core portion 21 and the shell portion 22 form a solid solution, it is difficult to clearly distinguish an interface. In this case, this sufficient as long as a core region 21A is present as a central portion of the active material 20 and a shell region 22A is present on the outer peripheral side. The core region 21A is included in the core portion 21, and the shell region 22A is included in the shell portion 22.

The core region 21A is a region in which an amount of transition metals is more than that of the shell region 22A. The shell region 22A is a region in which an amount of oxygen deficiency is more than that of the core region 21A.

The valences of transition metals change. The transition metals can alleviate changes in an electronic state when lithium ions transfer, and can increase a battery capacity. In addition, in a case where there is oxygen deficiency in a crystal, electrons originally trapped in oxygen become free electrons. Accordingly, when there is oxygen deficiency, electron conductivity increases.

Figure 3:
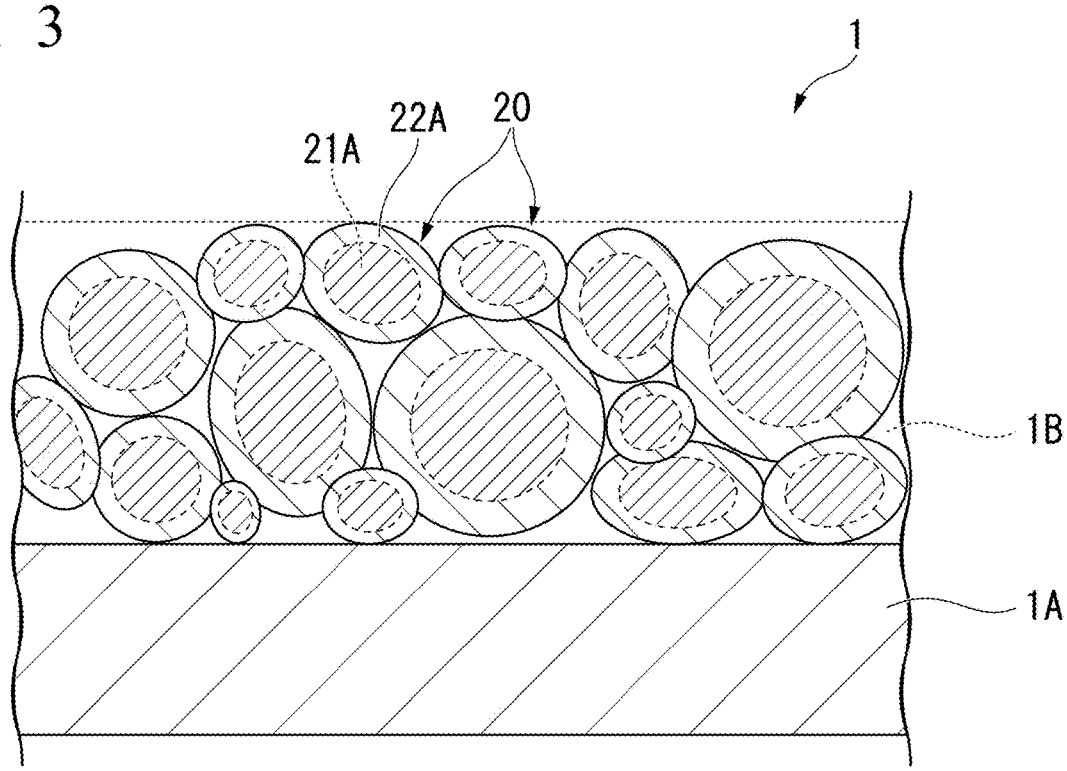
FIG. 3 is a cross-sectional schematic view showing an enlarged vicinity of a positive electrode of the all-solid-state lithium-ion secondary battery according to the present embodiment.

FIG. 3 is a cross-sectional schematic view showing an enlarged vicinity of a positive electrode of the all-solid-state lithium-ion secondary battery according to the present embodiment. The active material 20 is densely packed in the positive electrode active material layer 1B. The shell region 22A has a large amount of oxygen deficiency and high electron conductivity. The shell regions 22A of the plurality of active material pieces 20 are brought into contact with each other to form a conduction path for electrons. In other words, electrons are smoothly exchanged between each of the active material pieces 20 and the positive electrode current collector 1A. As a result, an internal resistance of the all-solid-state lithium-ion secondary battery 10 can be reduced.

In addition, the shell region 22A not only serves as a carrier of conduction, but also contributes to reactions of a battery itself. Accordingly, it is possible to curb reduction in battery capacity by providing of the shell region 22A.

It is preferable that the transition metals be at least one selected from the group consisting of V, Mn, Co, Ni, Fe, Ti, Cu, Cr, Nb, and Mo. These transition metals are widely used in batteries and are readily available. In addition, these transition metals also impart high performance to a battery.

An amount of oxygen deficiency can be analyzed by means of laser Raman spectroscopy, XAFS, ESR, TEM-EELS, X-ray powder Rietveld structure analysis, cathodoluminescence, or the like. An amount of oxygen deficiency in a radial direction of the active material 20 can be analyzed by scraping the active material 20 from the outer peripheral side.

As shown in FIG. 2, an average particle size Pc of the core portion 21 including the core region 21A and a thickness Ps of the shell portion 22 including the shell region 22A preferably satisfy a relationship of $0.4 \leq Pc/(2Ps+Pc) \leq 0.98$, and more preferably satisfy a relationship of $0.6 \leq Pc/(2Ps+Pc) \leq 0.9$. $2Ps+Pc$ corresponds to a particle size of the active material 20.

The core portion 21 greatly contributes to a capacity of the all-solid-state lithium-ion secondary battery 10, and the shell portion 22 greatly contributes in reducing an internal resistance of the all-solid-state lithium-ion secondary battery 10. When the core portion 21 and the shell portion 22 satisfy the above-described relationships, it is possible to achieve both an increase in a capacity of the all-solid-state lithium-ion secondary battery and a reduction in internal resistance. In addition, the shell portion 22 relaxes the stress caused by a volume change of the core portion 21 with a high capacity. Accordingly, when the core portion 21 and the shell portion 22 satisfy the above-described relationships, the shell portion 22 can sufficiently alleviate a volume change of the core portion 21.

In a case where the core portion 21 and the shell portion 22 have a clearly distinguishable interface, the average particle size Pc of the core portion 21 and the thickness Ps of the shell portion 22 are obtained with this interface as a boundary. In a case where an interface is not clearly distinguished, a value at a center and a value at an outer circumference end of the active material 20 of a predetermined transition metal (for example, vanadium) are measured, and a portion corresponding to a middle value is taken as the boundary.

A concentration of a predetermined transition metal can be measured using SEM-EDS, STEM-EDS, EPMA, LA-ICP-MS, or the like. For example, point analysis, line analysis, and surface analysis may be performed on each element, and the core region 21A and the shell region 22A may be specified from a change in concentration.

The active material shown in FIG. 2 is spherical, but an actual active material is amorphous. For this reason, the average particle size Pc of the core portion 21 is obtained as follows. A cross-sectional photograph of a lithium ion secondary battery imaged with a scanning electron microscope, a transmission electron microscope, or the like is subjected to image analysis. A value calculated from an area of the particle, with a diameter when assuming a shape is a circle, that is, an equivalent circle diameter, is used. From the viewpoint of reliability of data, it is desirable that the number of measurements be 300 or more. In the present specification, a particle size and an average particle size mean the equivalent circle diameter described above.

As the active material 20, transition metal oxides, complex transition metal oxides, or the like can be used.

Examples of transition metal oxides and complex transition metal oxides include a complex lithium manganese oxide $Li_2Mn_aMa_{1-a}O_3$ (0.8≤a≤1, Ma=Co, Ni), lithium cobalt oxide ($LiCoO_2$), lithium nickel oxide ($LiNiO_2$), a lithium manganese spinel ($LiMn_2O_4$), a complex metal oxide represented by the general formula: $LiNi_xCo_yMn_zO_2$ (x+y+z=1, 0≤x≤1, 0≤y≤1, 0≤z≤1), a lithium vanadium compound ($LiV_2O_5$), olivine-type $LiMbPO_4$ (where Mb is one or more kinds of element selected from Co, Ni, Mn, Fe, Mg, Nb, Ti, Al, and Zr), lithium vanadium phosphate ($Li_3V_2(PO_4)_3$ or $LiVOPO_4$), a Li-rich solid-solution positive electrode represented by $Li_2MnO_3$-$LiMcO_2$ (Mc=Mn, Co, Ni), lithium titanate ($Li_4Ti_5O_{12}$), a complex metal oxide represented by $Li_sNi_tCo_uAl_vO_2$ (0.9<s<1.3, 0.9<t+u+v<1.1), and the like.

The core region 21A and the shell region 22A are preferably composed of the same materials having different compositions, but may be composed of different materials. In a case where the regions are composed of different materials, the core portion 21 and the shell portion 22 are selected from the above-mentioned transition metal oxides, complex transition metal oxides, and the like to satisfy the conditions. In a case where the regions are composed of the same materials, a compositional ratio is changed so that the core region 21A and the shell region 22A satisfy the conditions.

The shell region 22A in the active material 20 preferably contains titanium (Ti). In addition, a Ti content in the shell region 22A is preferably higher than a Ti content in the core region 21A.

When Ti is contained, electron conductivity is improved. A Ti content in the shell region 22A that contributes to the conduction between the active material pieces 20 is higher than a Ti content in the core region 21A. Therefore, it is possible to increase electron conductivity between the active material pieces 20 and reduce an internal resistance of the all-solid-state lithium-ion secondary battery 10. In addition, the valence of Ti can be changed, which contributes to functioning of the shell region 22A as a battery.

The core region 21A of the active material 20 preferably contains vanadium (V). In addition, a content of V in the core region 21A is preferably higher than a content of V in the shell region 22A.

When V is contained, a battery capacity is increased. Because a contribution rate of the core region 21A to electron conduction is lower than that of the shell region 22A, it is preferable that an abundance of V in the core region 21A, which is for increasing a battery capacity, be large in the core region 21A.

It is preferable that the core region 21A contain 10 to 40 wt % of V and the shell region 22A contain 0.1 to 15 wt % of Ti. Since the core region 21A and the shell region 22A contain V and Ti within this range, respectively, it is possible to increase a battery capacity and reduce an internal resistance of the all-solid-state lithium-ion secondary battery 10.

The core region 21A and the shell region 22A preferably contain the identical elements, and more preferably are represented by the same composition formula.

When the core region 21A and the shell region 22A contain the identical elements, it is possible to improve adhesiveness between the core portion 21 including the core region 21A and the shell portion 22A including the shell region 22. In addition, contact resistance at an interface between the core portion 21 and the shell portion 22 is reduced.

Furthermore, it is even more preferable that General Formula (1) be satisfied in the core region 21A and the shell region 22A.

$$Li_aV_bAl_cTi_dP_eO_{12-x} \qquad (1)$$

It is preferable that 0.5≤a≤3.0, 1.2<b≤2.0, 0.01≤c<0.06, 0.01≤d<0.60, 2.8≤e≤3.2, and 0≤x<12 be satisfied in the core region 21A, and it is more preferable that 0.8≤a≤3.0, 1.2<b≤2.0, 0.01≤c<0.06, 0.01≤d<0.60, 2.9≤e≤3.1, and 0≤x<12 be satisfied in the core region 21A.

It is preferable that 0.5≤a≤3.0, 1.0≤b≤1.2, 0.06≤c≤0.09, 0.6≤d≤1.4, 2.8≤e≤3.2, and 0≤x<12 be satisfied in the shell region 22A, and it is more preferable that 0.8≤a≤3.0, 1.0≤b≤1.2, 0.06≤c≤0.09, 0.6≤d≤1.4, 2.9≤e≤3.1, and 0≤x<12 be satisfied in the shell region 22A.

When the core region 21A and the shell region 22A satisfy the above relationships, it is possible to further improve adhesiveness between the core portion 21 including the core region 21A and the shell portion 22A including the shell region 22. In addition, contact resistance at an interface between the core portion 21 and the shell portion 22 can be further reduced.

The positive electrode current collector 1A and the negative electrode current collector 2A may contain a positive electrode active material and a negative electrode active material, respectively. A content of active material pieces contained in each current collector is not particularly limited as long as the current collector functions as a current collector. For example, it is preferable that a volume ratio of the positive electrode current collector/positive electrode active material, or the negative electrode current collector/negative electrode active material be within a range of 90/10 to 70/30.

With the positive electrode current collector 1A and the negative electrode current collector 2A respectively contain the positive electrode active material and the negative electrode active material, adhesiveness between the positive electrode current collector 1A and the positive electrode active material layer 1B, and between the negative electrode current collector 2A and the negative electrode active material layer 2B is improved.

"Solid Electrolyte"

The solid electrolyte 3 is preferably a phosphate-based solid electrolyte. In addition, it is preferable to use a material having low electron conductivity and high lithium ion conductivity for the solid electrolyte 3.

For example, it is desirable that the material thereof be at least one kind selected from the group consisting of perovskite-type compounds such as $La_{0.5}Li_{0.5}TiO_3$, LISICON-type compounds such as $Li_{14}Zn(GeO_4)_4$, garnet-type compounds such as $Li_7La_3Zr_2O_{12}$, NASICON-type compounds such as lithium aluminum titanium phosphate [LifAlgTihPiO12 (f, g, h, and i are numbers satisfying 0.5≤f≤3.0, 0.09≤g≤0.50, 1.40≤h≤2.00, and 2.80≤i≤3.20)] or $Li_{1.5}Al_{0.5}Ge_{1.5}(PO_4)_3$, thio-LISICON-type compounds such as $Li_{3.25}Ge_{0.25}P_{0.75}S_4$ or $Li_3PS_4$, glass compounds such as $Li_2S$—$P_2S_5$ or $Li_2O$—$V_2O_5$—$SiO_2$, and phosphoric acid compounds such as $Li_3PO_4$, $Li_{3.5}Si_{0.5}P_{0.5}O_4$, or $Li_{2.9}PO_{3.3}N_{0.46}$.

The solid electrolyte 3 is preferably selected according to the active material 20 used for the positive electrode layer 1 and the negative electrode layer 2. For example, the solid electrolyte 3 more preferably contains the identical elements to the core region 21A and the shell region 22A constituting the active material 20, and more preferably is represented by the same composition formula.

When the solid electrolyte 3 contains the identical elements to the core region 21A and the shell region 22A constituting the active material 20, the bonding at an interface between the positive electrode active material layer 1B and negative electrode active material layer 2B, and the solid electrolyte 3 becomes firm. In addition, a contact area at an interface between the positive electrode active material layer 1B and negative electrode active material layer 2B, and the solid electrolyte 3 can be widened.

Accordingly, in a case where the core region 21A and the shell region 22A are represented by General Formula (1), the solid electrolyte 3 preferably contains a compound represented by General Formula (1).

In General Formula (1), it is preferable that $0.5 \le a \le 3.0$, $0.01 \le b < 1.0$, $0.09 < c \le 0.30$, $1.4 < d \le 2$, $2.8 \le e \le 3.2$, and $0 \le x < 12$ be satisfied in the solid electrolyte 3, and it is more preferable that $0.8 \le a \le 3.0$, $0.01 \le b < 1.0$, $0.09 < c \le 0.3$, $1.4 < d \le 2$, $2.9 \le e \le 3.1$, and $0 \le x < 12$ be satisfied in the solid electrolyte 3.

(Interlayer)

An interlayer may be provided between the solid electrolyte 3, and the positive electrode active material layer 1B and the negative electrode active material layer 2B. A positive electrode interlayer present between the solid electrolyte 3 and the positive electrode active material layer 1B has a composition intermediate between the solid electrolyte 3 and the positive electrode active material layer 1B. A negative electrode interlayer present between the solid electrolyte 3 and the negative electrode active material layer 2B preferably has a composition intermediate between the solid electrolyte 3 and the negative electrode active material layer 1B. By having the interlayer, adhesiveness between the solid electrolyte 3, and the positive electrode active material layer 1B and the negative electrode active material layer 2B can be further improved.

The phrase "the composition is intermediate between" can be defined as follows. For example, in a case where the solid electrolyte and the active material layer contain the identical elements, the phrase means that a ratio of each common element is between a ratio of common elements in the solid electrolyte and a ratio of common elements in the active material layer. On the other hand, in a case where the solid electrolyte and the active material layer do not contain the identical elements, the phrase means that a ratio of elements common to the interlayer and the solid electrolyte is 0 or more and equal to or less than a ratio that the solid electrolyte has; and that a ratio of elements common to the interlayer and the active material layer is 0 or more and equal to or less than a ratio that the active material layer has.

In addition, it is preferable that a crystal structure of the interlayers be the same crystal structure as at least one of the solid electrolyte and the active material. The term "the same crystal structure" means to have the same space group. When the crystal structure is the same, distortion is hardly generated at an interface, and therefore adhesiveness between the solid electrolyte and the active material layer can be enhanced.

(Terminal)

It is preferable to use a material having high conductivity for a first internal terminal 5 and a second internal terminal 6 of the all-solid-state lithium-ion secondary battery 10. For example, silver, gold, platinum, aluminum, copper, tin, and nickel can be used. The same material can be used for the first external terminal and the second external terminal (not shown). The internal terminal (the first internal terminal 5 and the second internal terminal 6) and an external terminal (a first external terminal and a second external terminal) may be composed of the same material or may be composed of different materials. The external terminal may have a single layer or a plurality of layers.

(Protective Layer)

In addition, the all-solid-state lithium-ion secondary battery 10 may have a protective layer on an outer periphery of the laminate 4 for protecting the laminate 4 and terminals electrically, physically, and chemically. It is preferable that a material constituting the protective layer have excellent insulation, durability, and moisture resistance, and be environmentally safe. For example, it is preferable to use glass, ceramics, thermosetting resins, or photocurable resins. One kind or a plurality of kinds may be used in combination as a material of the protective layer. In addition, the protective layer may be a single layer, but is preferably a plurality of layers. Among them, an organic-inorganic hybrid in which a thermosetting resin and a ceramic powder are mixed is particularly preferable.

(Method for Manufacturing Active Material)

An example of a method for forming the active material 20 will be described. The active material 20 is not limited to the following formation method. A method for manufacturing the active material 20 differs according to a case in which the core portion 21 and the shell portion 22 are composed of different materials, and a case in which the core portion 21 and the shell portion 22 are composed of materials represented by the same composition formula.

In a case where the core portion 21 and the shell portion 22 are composed of different materials, first, materials to be used for the core portion 21 and the shell portion 22 are selected. In this case, a material is selected to satisfy the relationships between the core region 21A and the shell region 22A.

Then, the core portion 21 is coated with the shell portion 22. A known method can be used as a coating method. For example, it is possible to use a vapor phase method such as a CVD method or a laser ablation method, a liquid phase method such as a spray drying method or a hanging drop method, a solid phase method in which mixing is performed while imparting shear stress, or the like.

When the active material 20 coated with the shell portion 22 is calcined at 400° C. or higher, elements constituting the core portion 21 and the shell portion 22 diffuse, thereby forming a solid solution. As a result, the active material 20 is obtained.

In a case where the core portion 21 and the shell portion 22 are composed of the same material, first, a material that is the basis of the active material is wet-mixed. For example, in a case of producing the material of General Formula (1), $Li_2CO_3$, $Al_2O_3$, $V_2O_5$, $TiO_2$, and $NH_4H_2PO_4$ are wet-mixed with a ball mill or the like.

The obtained powder is dehydrated and dried, and then calcined in air. The calcined product is wet-pulverized with a ball mill, and dehydrated and dried. Finally, by calcining in a reducing atmosphere, the active material 20 having the core region 21A and the shell region 22A is obtained.

(Method for Manufacturing all-Solid-State Lithium-Ion Secondary Battery)

A method for manufacturing the all-solid-state lithium-ion secondary battery 10 may use a simultaneous calcination method or may use a sequential calcination method.

The simultaneous calcination method is a method in which materials forming each layer are laminated to produce the laminate by batch calcination. The sequential calcination method is a method for producing each layer in order, and includes a calcinating step for every layer production. Using the simultaneous calcination method can reduce the number of processing steps of the all-solid-state lithium-ion secondary battery 10. In addition, using the simultaneous calcination method makes the obtained laminate 4 dense. Hereinafter, a case of using the simultaneous calcination method will be described as an example.

The simultaneous calcination method includes a step of creating a paste of each material constituting the laminate 4, a step of coating and drying the paste to produce a green sheet, and a step of laminating the green sheet and simultaneously calcinating the produced laminate sheet.

First, each of materials of the positive electrode current collector 1A, the positive electrode active material layer 1B, the solid electrolyte 3, the negative electrode active material layer 2B, and the negative electrode current collector 2A, which constitute the laminate 4, are made into a paste.

A method for making a paste is not particularly limited. For example, powders of each material are mixed into a vehicle to obtain a paste. A vehicle is a generic name of a medium in a liquid phase. Vehicles generally include solvents and binders. According to such a method, a paste for the positive electrode current collector 1A, a paste for the positive electrode active material layer 1B, a paste for the solid electrolyte 3, a paste for the negative electrode active material layer 2B, and a paste for the negative electrode current collector 2A are produced.

Next, a green sheet is produced. The green sheet is obtained by applying the produced paste onto a substrate such as polyethylene terephthalate (PET) in a desired order, drying if necessary, and peeling off the substrate. A method for applying a paste is not particularly limited. For example, known methods such as screen printing, coating, transfer, or doctor blade can be adopted.

Each green sheet produced is piled up in a desired order and number of laminates. Alignment, cutting, and the like are performed if necessary to produce a laminate. In a case of producing a parallel-type or series-parallel-type battery, it is preferable to perform alignment to pile up sheets so that an end surface of the positive electrode current collector 1A and an end surface of the negative electrode current collector 1B do not correspond to each other.

When producing a laminate, a positive electrode active material layer unit and a negative electrode active material layer unit to be described below may be prepared to produce the laminate.

First, a paste for the solid electrolyte 3 is formed into a sheet shape on a PET film by a doctor blade method and dried, and therefore the solid electrolyte layer is formed. A paste for the positive electrode active material layer 1B is printed on the obtained solid electrolyte layer by screen printing and dried, and therefore the positive electrode active material layer 1B is formed.

Next, a paste for the positive electrode current collector 1A is printed on the produced positive electrode active material layer 1B by screen printing and dried, and therefore the positive electrode current collector 1A is formed. In addition, the paste for positive electrode active material layer 1B is printed thereon again by screen printing and dried. Then, the PET film is peeled off to obtain the positive electrode active material layer unit.

A negative electrode active material layer unit is also produced in the same procedure. In the negative electrode active material layer unit, the negative electrode active material layer 2B, the negative electrode current collector 2A, and the negative electrode active material layer 2B are formed in this order on a sheet for the solid electrolyte 3.

One sheet of the positive electrode active material layer unit and one sheet of the negative electrode active material layer unit are laminated. In this case, the positive electrode active material layer 1B, the positive electrode current collector 1A, the positive electrode active material layer 1B, the solid electrolyte 3, the negative electrode active material layer 2B, the negative electrode current collector 2A, the negative electrode active material layer 2B, and the solid electrolyte 3 are formed in this order. Each unit is shifted to be piled up so that the positive electrode current collector 1A of a first sheet of the positive electrode active material layer unit extends toward only one end surface, and the negative electrode current collector 2A of a second sheet of the negative electrode active material layer unit extends toward only the other surface. The sheet for solid electrolyte 3 having a predetermined thickness is further piled up on both sides of the stacked units. Therefore, a laminate is produced.

The produced laminate is pressure-bonded at once. The pressure bonding is performed while heating. A heating temperature is, for example, 40 to 95° C.

For example, the pressure-bonded laminate is heated to 500° C. to 750° C. under a nitrogen, hydrogen, and steam atmosphere to perform debinding. Thereafter, heating to 600° C. to 1000° C. under a nitrogen, hydrogen, and steam atmosphere and calcinating are performed to obtain a sintered body. A calcination time is, for example, 0.1 to 3 hours.

The sintered body may be put into a cylindrical container together with an abrasive such as alumina to be subjected to barrel polishing. Accordingly, it is possible to chamfer corners of the laminate. As another method, polishing may be performed by sand blasting. This method is preferable because only a specific portion can be cut.

(Formation of Terminal)

The first external terminal 5 and the second external terminal 6 are attached to the sintered laminate 4 (sintered body). The first external terminal 5 and the second external terminal 6 are formed so as to be in electrical contact with the positive electrode current collector 1A and the negative electrode current collector 2A, respectively. For example, the terminals can be formed by known means such as a sputtering method, a dipping method, or a spray coating method for the positive electrode current collector 1A and the negative electrode current collector 2A which are exposed from a side surface of the sintered body. In a case where the terminal is formed only at a predetermined portion, the terminal is formed by, for example, performing masking with a tape, or the like.

When providing the interlayer, a green sheet of the interlayer is produced to be disposed between the active material layer and the current collector layer. The other procedures are the same procedures as in a case where no interlayer is included.

Hereinbefore, the embodiments of the present invention have been described in detail with reference to the drawings, but each configuration and combination thereof, and the like in each embodiment is an example. Additions, omissions, substitutions, and other modifications can be made without departing from the spirit of the present invention.

EXAMPLES

Example 1

Active material pieces were prepared by a solid-phase reaction method. First, $Li_2CO_3$, $Al_2O_3$, $V_2O_5$, $TiO_2$, and $NH_4H_2PO_4$ were prepared as materials that form the basis of the active material. These were wet-mixed with a ball mill for 16 hours. A sample after the wet mixing was dehydrated and dried and calcined in air at 800° C. for 2 hours. Then, the calcined product was subjected to wet grinding with a ball mill for 16 hours, and then dehydrated and dried. The obtained powder was calcined in a gaseous mixture atmosphere of nitrogen and 3% hydrogen at 800° C. for 2 hours. Therefore, an active material having a core region and a shell region was obtained.

The obtained active material was made into a paste to produce green sheets of negative electrode active material and positive electrode active material. In addition, in the same manner, materials serving as the basis for an interlayer, a current collector, and a solid electrolyte were produced by a solid-phase reaction method. Therefore, each of green sheets was produced. These produced green sheets were laminated in a predetermined order, debindered at 650° C., and then simultaneously calcined. A temperature of simultaneous calcination was 800° C., and a calcination time was 1 hour.

Figure 4:
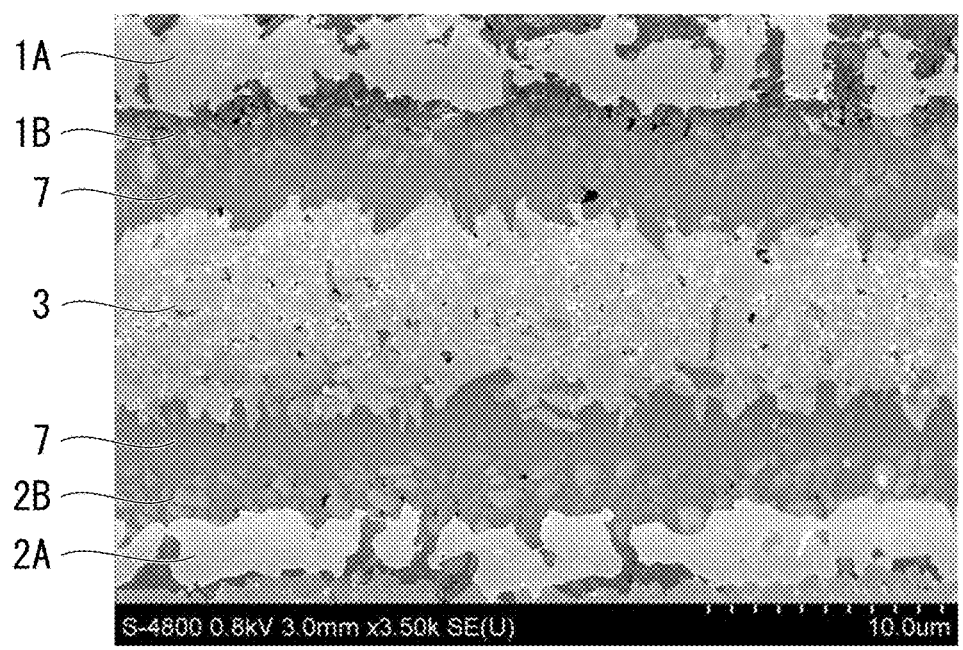
FIG. 4 is a cross-sectional view of a main part of the battery imaged with a scanning microscope.
Figure 5A:
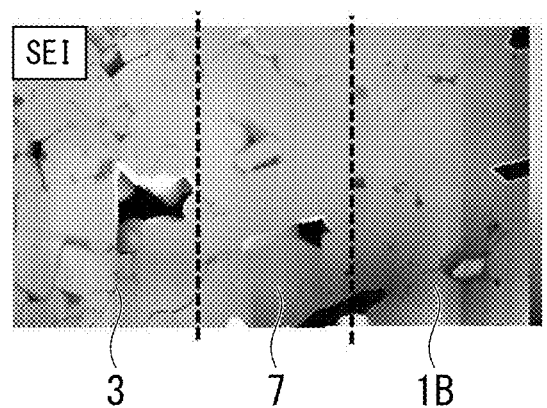
FIG. 5A is a cross-sectional view after composition analysis of a main part of the battery (secondary electron image (SEI)).
Figure 5B:
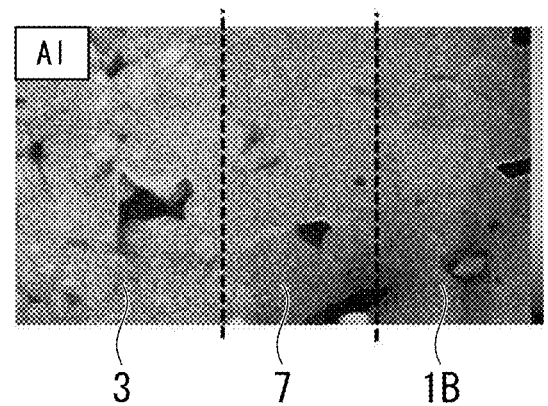
FIG. 5B is a cross-sectional view after composition analysis of a main part of the battery (Al).
Figure 5C:
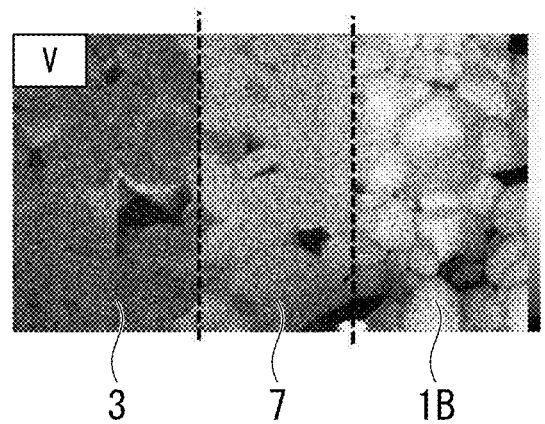
FIG. 5C is a cross-sectional view after composition analysis of a main part of the battery (V).
Figure 5D:
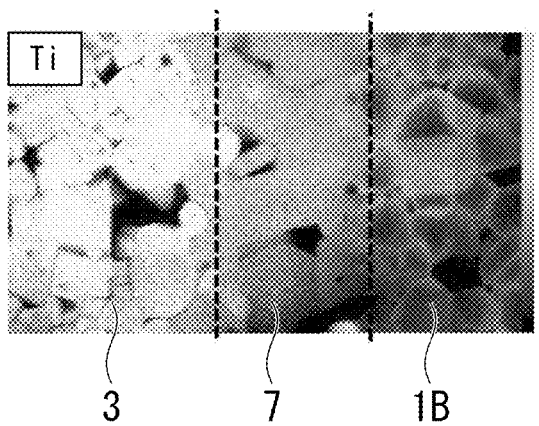
FIG. 5D is a cross-sectional view after composition analysis of a main part of the battery (Ti).

FIG. 4 is a cross-sectional view of a main part of the obtained battery imaged with a scanning microscope. In addition, FIGS. 5A to 5D are cross-sectional views after composition analysis of a main part of the obtained battery. FIG. 5A is a secondary electron image (SEI). FIG. 5B is a mapping image of energy dispersive X-ray analysis (EDX) of Al element. FIG. 5C is a mapping image of energy dispersive X-ray analysis (EDX) of V element. FIG. 5D is a mapping image of energy dispersive X-ray analysis (EDX) of Ti element. An interlayer 7 is provided between the positive electrode active material layer 1B and the negative electrode active material layer 2B, and the solid electrolyte 3. Compositions of each layer were as follows.

<Composition of all-Solid-State Lithium-Ion Secondary Battery of Example 1>

A positive electrode current collector 1A and a negative electrode current collector 2A: a mixture of Cu and the following active material pieces A positive electrode active material layer 1B and a negative electrode active material layer 2B A core region 21A: $Li_{2.9}V_{1.65}Al_{0.03}Ti_{0.4}P_{2.9}O_{12-x}$ A shell region 22A: $Li_{2.4}V_{1.05}Al_{0.06}Ti_{0.90}P_{2.95}O_{12-x}$ A solid electrolyte 3: $Li_{1.10}V_{0.05}Al_{0.12}Ti_{1.70}P_{3.00}O_{12-x}$ As shown in FIG. 5A, the positive electrode active material layer 1B is densely packed with granular active material pieces. As shown in FIG. 5B, Al element is homogeneously present in the positive electrode active material layer 1B. On the other hand, V element and Ti element are inhomogeneously present. As shown in FIG. 5C, a large amount of V element is present in the vicinity of the central portion of each granular active material. As shown in FIG. 5D, a large amount of Ti element is present in the vicinity of the surface of each granular active material. In other words, the condition in which the active material has a core-shell structure is recognized. Although not shown, the same tendency was confirmed also in the negative electrode active material layer 2B.

A ratio (Pc/(2Ps+Pc)) of an average particle size Pc of the core portion to a thickness Ps of the shell portion was 0.9.

Then, an InGa electrode paste was applied to an end surface of the obtained laminate and to an end surface of the laminate 4 immediately after calcination to form a terminal electrode. Therefore, an all-solid-state lithium secondary battery was produced.

A battery capacity of the all-solid-state lithium-ion secondary battery of Example 1 was 102.4 µAh, and an internal resistance was 1.32 kΩ. The battery capacity was measured by charging and discharging at a constant current by using a charge and discharge measuring machine. A charge and discharge current was 30 µA, and a cutoff voltage during charging and discharging were 1.8 V and 0 V, respectively. In addition, a pause time after charging and after discharging was set to 1 minute. An internal resistance was obtained by dividing a difference (IR drop) between an open-circuit voltage after the pause of charging (immediately before the start of discharging) and a voltage after 1 second from the start of discharging, by a current value at the time of discharging.

Comparative Example 1

Comparative Example 1 was different from Example 1 in that the powder was not calcined in a gaseous mixture atmosphere of nitrogen and 3% hydrogen. In other words, an active material was different from Example 1 in that the active material did not have a core-shell structure. Other conditions were the same as in Example 1.

A battery capacity of an all-solid-state lithium-ion secondary battery of Comparative Example 1 was 31.2 µAh, and an internal resistance was 11.1 kΩ. Since the all-solid-state lithium-ion secondary battery of Comparative Example 1 did not have the core-shell structure, electron conductivity in an active material layer was poor and an internal resistance increased.

Comparative Example 2

Comparative Example 2 was different from Example 1 in that the powder was not calcined in a gaseous mixture atmosphere of nitrogen and 3% hydrogen, but a surface of the obtained powder was coated with carbon. In other words, the active material had a core-shell structure, but the shell portion was a carbon coating. Coating of carbon was performed using a mechanical particle compounding apparatus (compressive shear impact-type particle compounding apparatus NOBILTA, manufactured by HOSOKAWA MICRON CORPORATION). Other conditions were the same as in Example 1.

A battery capacity of an all-solid-state lithium-ion secondary battery of Comparative Example 2 was 36.9 µAh, and an internal resistance was 8.26 kΩ. An all-solid-state lithium-ion secondary battery of Comparative Example 2 had high electron conductivity due to carbon coating, and an internal resistance was smaller, as compared with Comparative Example 1. However, a battery capacity was small.

Example 2

Example 2 was different from Example 1 in that a composition of the solid electrolyte was different from that of the positive electrode active material layer and the negative electrode active material layer. Other conditions were the same as in Example 1. The compositions of each layer of an all-solid-state lithium-ion secondary battery in Example 2 were as follows.

<Composition of all-Solid-State Lithium-Ion Secondary Battery of Example 2>

A positive electrode current collector 1A and a negative electrode current collector 2A: a mixture of Cu and the following active material pieces A positive electrode active material layer 1B and a negative electrode active material layer 2B A core region 21A: $Li_{2.9}V_{1.65}Al_{0.03}T_{0.40}P_{2.9}O_{12-x}$ A shell region 22A: $Li_{2.4}V_{1.05}Al_{0.06}Ti_{0.90}P_{2.95}O_{12-x}$ A solid electrolyte 3: $LiTi_2P_3O_{12}$ A battery capacity of the all-solid-state lithium-ion secondary battery of Example 2 was 88.6 µAh, and an internal resistance was 2.11 kΩ. The all-solid-state lithium-ion secondary battery of Example 2 had higher internal resistance than Example 1. The reason is considered to be because, in Example 1, since the compositions of the solid electrolyte and the active material were different, adhesiveness was poor and an internal resistance increased as compared with Example 1.

Examples 3 and 4

All-solid-state lithium-ion secondary batteries of Example 3 and Example 4 were different from Example 1 in that a compositional ratio at the time of producing active material pieces by a solid-phase reaction method was changed. Other conditions were the same as in Example 1. Specifically, a ratio of vanadium ions was changed, and ratios of other ion types were also changed accordingly.

As a result, compositions of each layer of the all-solid-state lithium-ion secondary batteries in Example 3 and Example 4 were as follows.

<Composition of all-Solid-State Lithium-Ion Secondary Battery of Example 3>

A positive electrode current collector 1A and a negative electrode current collector 2A: a mixture of Cu and the following active material pieces A positive electrode active material layer 1B and a negative electrode active material layer 2B A core region 21A: $Li_{2.8}V_{2.0}Al_{0.03}Ti_{0.3}P_{2.8}O_{12-x}$
A shell region 22A: $Li_{2.3}V_{1.0}Al_{0.07}Ti_{1.10}P_{2.83}O_{12-x}$
A solid electrolyte 3: $Li_{1.0}V_{0.05}Al_{0.12}Ti_{2.0}P_{2.87}O_{12-x}$ <Composition of all-Solid-State Lithium-Ion Secondary Battery of Example 4>

A positive electrode current collector 1A and a negative electrode current collector 2A: $Cu+Li_aV_bAl_cTi_dP_eO_{12-x}$ A positive electrode active material layer 1B and a negative electrode active material layer 2B A core region 21A: $Li_{2.7}V_{1.2}Al_{0.03}Ti_{0.55}P_{3.1}O_{12-x}$
A shell region 22A: $Li_{2.2}V_{1.2}Al_{0.06}Ti_{0.65}P_{3.12}O_{12-x}$
A solid electrolyte 3: $Li_{1.1}V_{0.05}Al_{0.12}Ti_{1.6}P_{3.2}O_{12-x}$ Battery capacities of the all-solid-state lithium-ion secondary batteries of Example 3 and Example 4 were 101.2 µAh and 95.4 µAh, respectively, and internal resistances were 1.56 kΩ and 1.89 kΩ, respectively.

Examples 5 and 6

All-solid-state lithium-ion secondary batteries of Example 5 and Example 6 were different from Example 1 in that a compositional ratio at the time of producing active material pieces by a solid-phase reaction method was changed. Other conditions were the same as in Example 1. Specifically, a ratio of titanium ions was changed, and ratios of other ion types were also changed accordingly.

As a result, compositions of each layer of the all-solid-state lithium-ion secondary batteries in Example 5 and Example 6 were as follows.

<Composition of all-Solid-State Lithium-Ion Secondary Battery of Example 5>

A positive electrode current collector 1A and a negative electrode current collector 2A: a mixture of Cu and the following active material pieces A positive electrode active material layer 1B and a negative electrode active material layer 2B A core region 21A: $Li_{2.95}V_{1.7}Al_{0.03}Ti_{0.4}P_{2.8}O_{12-x}$
A shell region 22A: $Li_{1.3}V_{1.0}Al_{0.06}Ti_{1.4}P_{2.85}O_{12-x}$
A solid electrolyte 3: $Li_{1.1}V_{0.05}Al_{0.12}Ti_{1.7}P_{3.0}O_{12-x}$ <Composition of all-Solid-State Lithium-Ion Secondary Battery of Example 6>

A positive electrode current collector 1A and a negative electrode current collector 2A: a mixture of Cu and the following active material pieces A positive electrode active material layer 1B and a negative electrode active material layer 2B A core region 21A: $Li_{2.9}V_{1.65}Al_{0.03}Ti_{0.4}P_{2.9}O_{12-x}$
A shell region 22A: $Li_{2.6}V_{1.05}Al_{0.06}Ti_{0.6}P_{3.1}O_{12-x}$
A solid electrolyte 3: $Li_{1.0}V_{0.05}Al_{0.12}Ti_{1.6}P_{3.2}O_{12-x}$ Battery capacities of the all-solid-state lithium-ion secondary batteries of Example 5 and Example 6 were 92.1 µAh and 96.6 µAh, respectively, and internal resistances were 1.92 kΩ and 1.73 kΩ, respectively.

Example 7

Example 7 was different from Example 1 in that $V_2O_5$ was changed to $Fe_2O_5$ among materials serving as the basis to be mixed by a solid-phase reaction method. In other words, a difference was that a transition metal contained in a core region was not vanadium but iron. Other conditions were the same as in Example 1. As a result, the compositions of an all-solid-state lithium-ion secondary battery in Example 7 were as follows.

<Composition of all-Solid-State Lithium-Ion Secondary Battery of Example 7>

A positive electrode current collector 1A and a negative electrode current collector 2A: a mixture of Cu and the following active material pieces A positive electrode active material layer 1B and a negative electrode active material layer 2B A core region 21A: $Li_{2.9}Fe_{1.65}Al_{0.03}Ti_{0.4}P_{2.9}O_{12-x}$
A shell region 22A: $Li_{2.4}Fe_{1.05}Al_{0.06}Ti_{0.90}P_{2.95}O_{12-x}$
A solid electrolyte 3: $Li_{1.10}Fe_{0.05}Al_{0.12}Ti_{1.70}P_{3.00}O_{12-x}$ A battery capacity of the all-solid-state lithium-ion secondary battery of Example 7 was 85.3 µAh, and an internal resistance was 2.12 kΩ.

The above results are summarized in Table 1 below.

TABLE 1

|  |  | Li | V<br>Fe (Example 7) | Al | Ti | P | Pc/(2Ps + Pc) | Battery capacity (µAh) | Internal resistance (kΩ) |
|---|---|---|---|---|---|---|---|---|---|
| Example 1 | Core region | 2.90 | 1.65 | 0.03 | 0.40 | 2.90 | 0.9 | 102.4 | 1.32 |
|  | Shell region | 2.40 | 1.05 | 0.06 | 0.90 | 2.95 |  |  |  |
|  | Solid electrolyte | 1.10 | 0.05 | 0.12 | 1.70 | 3.00 |  |  |  |
| Comparative Example 1 | Core region | 2.90 | 1.65 | 0.03 | 0.40 | 2.90 | 0.9 | 31.2 | 11.1 |
|  | Shell region | — |  |  |  |  |  |  |  |
|  | Solid electrolyte | 1.10 | 0.05 | 0.12 | 1.70 | 3.00 |  |  |  |
| Comparative Example 2 | Core region | 2.90 | 1.65 | 0.03 | 0.40 | 2.90 | 0.9 | 36.9 | 8.26 |
|  | Shell region |  | Carbon coat |  |  |  |  |  |  |
|  | Solid electrolyte | 1.10 | 0.05 | 0.12 | 1.70 | 3.00 |  |  |  |

TABLE 1-continued

|  |  | Li | V Fe (Example 7) | Al | Ti | P | Pc/(2Ps + Pc) | Battery capacity (μAh) | Internal resistance (kΩ) |
|---|---|---|---|---|---|---|---|---|---|
| Example 2 | Core region | 2.90 | 1.65 | 0.03 | 0.40 | 2.90 | 0.9 | 88.6 | 2.11 |
|  | Shell region | 2.40 | 1.05 | 0.06 | 0.90 | 2.95 |  |  |  |
|  | Solid electrolyte | 1.00 | — | — | 2.00 | 3.00 |  |  |  |
| Example 3 | Core region | 2.80 | 2.00 | 0.03 | 0.30 | 2.80 | 0.9 | 101.2 | 1.56 |
|  | Shell region | 2.30 | 1.00 | 0.07 | 1.10 | 2.83 |  |  |  |
|  | Solid electrolyte | 1.00 | 0.05 | 0.12 | 2.00 | 2.87 |  |  |  |
| Example 4 | Core region | 2.70 | 1.20 | 0.03 | 0.55 | 3.10 | 0.9 | 95.4 | 1.89 |
|  | Shell region | 2.20 | 1.20 | 0.06 | 0.65 | 3.12 |  |  |  |
|  | Solid electrolyte | 1.10 | 0.05 | 0.12 | 1.60 | 3.20 |  |  |  |
| Example 5 | Core region | 2.95 | 1.70 | 0.03 | 0.40 | 2.80 | 0.9 | 92.1 | 1.92 |
|  | Shell region | 1.30 | 1.00 | 0.06 | 1.40 | 2.85 |  |  |  |
|  | Solid electrolyte | 1.10 | 0.05 | 0.12 | 1.70 | 3.00 |  |  |  |
| Example 6 | Core region | 2.90 | 1.65 | 0.03 | 0.40 | 2.90 | 0.9 | 96.6 | 1.73 |
|  | Shell region | 2.60 | 1.05 | 0.06 | 0.60 | 3.10 |  |  |  |
|  | Solid electrolyte | 1.00 | 0.05 | 0.12 | 1.60 | 3.20 |  |  |  |
| Example 7 | Core region | 2.90 | 1.65 | 0.03 | 0.40 | 2.90 | 0.9 | 85.3 | 2.12 |
|  | Shell region | 2.40 | 1.05 | 0.06 | 0.90 | 2.95 |  |  |  |
|  | Solid electrolyte | 1.10 | 0.05 | 0.12 | 1.70 | 3.00 |  |  |  |

INDUSTRIAL APPLICABILITY

In the all-solid-state lithium-ion battery, it is possible to further increase an output of the all-solid-state lithium-ion battery by realizing high capacity of a battery capacity and a reduction in internal resistance at the same time.

REFERENCE SIGNS LIST

1: Positive electrode layer
1A: Positive electrode current collector
1B: Positive electrode active material layer
2: Negative electrode layer
2A: Negative electrode current collector
2B: Negative electrode active material layer
3: Solid electrolyte
4: Laminate
5: First internal terminal
6: Second internal terminal
7: Interlayer
20: Active material
21: Core
21A: Core region
22: Shell portion
22A: Shell region

The invention claimed is:

1. An active material comprising:
a core region; and
a shell region,
wherein a wt % of transition metals in a composition of the core region is higher than a wt % of transition metals in a composition of the shell region,
an oxygen deficiency in the composition of the shell region is more than an oxygen deficiency in the composition of the core region, and
the core region contains 10 to 40 wt % of V and the shell region contains 0.1 to 15 wt % of Ti.

2. The active material according to claim 1, wherein the transition metals are at least one selected from the group consisting of V, Mn, Co, Ni, Fe, Ti, Cu, Cr, Nb, and Mo.

3. The active material according to claim 1, wherein a Ti content in the shell region is more than a Ti content in the core region.

4. The active material according to claim 1, wherein an average particle size Pc of a core portion including the core region and a thickness Ps of a shell portion including the shell region satisfy a relationship of $0.4 \leq Pc/(2Ps+Pc) \leq 0.98$.

5. The active material according to claim 1, wherein a core portion including the core region and a shell portion including the shell region form a solid solution.

6. An all-solid-state lithium-ion secondary battery, comprising:
a pair of electrodes that contain the active material according to claim 1; and
a solid electrolyte that is sandwiched between the pair of electrodes.

7. The all-solid-state lithium-ion secondary battery according to claim 6, wherein the core region of the active material, the shell region of the active material, and the solid electrolyte contain identical elements.

8. An all-solid-state lithium-ion secondary battery, comprising:
a pair of electrodes that contain an active material; and
a solid electrolyte that is sandwiched between the pair of electrodes,
wherein the active material comprises a core region and a shell region,
a wt % of transition metals in a composition of the core region is higher than a wt % of transition metals in a composition of the shell region,
an oxygen deficiency in the composition of the shell region is more than an oxygen deficiency in the composition of the core region,
the core region of the active material, the shell region of the active material, and the solid electrolyte satisfy a general formula (1) below,

$$Li_a V_b Al_c Ti_d P_e O_{12-x} \qquad (1),$$

$0.5 \leq a \leq 3.0$, $1.2 < b \leq 2.0$, $0.01 \leq c < 0.06$, $0.01 \leq d < 0.60$, $2.8 \leq e \leq 3.2$, and $0 \leq x < 12$ are satisfied in the core region,
$0.5 \leq a \leq 3.0$, $1.0 \leq b \leq 1.2$, $0.06 \leq c \leq 0.09$, $0.6 \leq d \leq 1.4$, $2.8 \leq e \leq 3.2$, and $0 \leq x < 12$ are satisfied in the shell region, and
$0.5 \leq a \leq 3.0$, $0.01 \leq b < 1.0$, $0.09 < c \leq 0.30$, $1.4 < d \leq 2.0$, $2.8 \leq e \leq 3.2$, and $0 \leq x < 12$ are satisfied in the solid electrolyte.

9. The all-solid-state lithium-ion secondary battery according to claim 8, wherein 0.8≤a≤3.0, 1.2<b≤2.0, 0.01≤c<0.06, 0.01≤d<0.60, 2.9≤e≤3.1, and 0≤x<12 are satisfied in the core region, 0.8≤a≤3.0, 1.0≤b≤1.2, 0.06≤c≤0.09, 0.6≤d≤1.4, 2.9≤e≤3.1, and 0≤x<12 are satisfied in the shell region, and 0.8≤a≤3.0, 0.01≤b<1.0, 0.09<c≤0.3, 1.4<d≤2.0, 2.9≤e≤3.1, and 0≤x<12 are satisfied in the solid electrolyte.

10. The all-solid-state lithium-ion secondary battery according to claim 6, wherein a pair of electrode layers and a solid electrolyte layer provided between the pair of electrode layers have a relative density of 80% or more.

11. The active material according to claim 2, wherein a Ti content in the shell region is more than a Ti content in the core region.

12. An active material comprising:
a core region; and
a shell region,
wherein an amount of transition metals in the core region is more than an amount of transition metals in the shell region,
an amount of oxygen deficiency in the shell region is more than an amount of oxygen deficiency in the core region,
the core region and the shell region satisfy a general formula (1) below, $$Li_aV_bAl_cTi_dP_eO_{12-x}$$ (1), 0.5≤a≤3.0, 1.2<b≤2.0, 0.01≤c<0.06, 0.01≤d<0.60, 2.8≤e≤3.2, and 0≤x<12 are satisfied in the core region, and 0.5≤a≤3.0, 1.0≤b≤1.2, 0.06≤c≤0.09, 0.6≤d≤1.4, 2.8≤e≤3.2, and 0≤x<12 are satisfied in the shell region.

13. The active material according to claim 12, wherein the core region contains 10 to 40 wt % of V and the shell region contains 0.1 to 15 wt % of Ti.

14. The active material according to claim 12, wherein an average particle size Pc of a core portion including the core region and a thickness Ps of a shell portion including the shell region satisfy a relationship of 0.4≤Pc/(2Ps+Pc)≤0.98.

15. The active material according to claim 12, wherein a core portion including the core region and a shell portion including the shell region form a solid solution.

16. An all-solid-state lithium-ion secondary battery, comprising:
a pair of electrodes that contain the active material according to claim 12; and
a solid electrolyte that is sandwiched between the pair of electrodes.

17. The all-solid-state lithium-ion secondary battery according to claim 16,
wherein the solid electrolyte satisfies the general formula (1) below, $$Li_aV_bAl_cTi_dP_eO_{12-x}$$ (1), and 0.5≤a≤3.0, 0.01≤b<1.0, 0.09<c≤0.30, 1.4<d≤2.0, 2.8≤e≤3.2, and 0≤x<12 are satisfied in the solid electrolyte.

18. The all-solid-state lithium-ion secondary battery according to claim 17,
wherein 0.8≤a≤3.0, 1.2<b≤2.0, 0.01≤c<0.06, 0.01≤d<0.60, 2.9≤e≤3.1, and 0≤x<12 are satisfied in the core region, 0.8≤a≤3.0, 1.0≤b≤1.2, 0.06≤c≤0.09, 0.6≤d≤1.4, 2.9≤e≤3.1, and 0≤x<12 are satisfied in the shell region, and 0.8≤a≤3.0, 0.01≤b<1.0, 0.09<c≤0.3, 1.4<d≤2.0, 2.9≤e≤3.1, and 0≤x<12 are satisfied in the solid electrolyte.

19. The all-solid-state lithium-ion secondary battery according to claim 16, wherein a pair of electrode layers and a solid electrolyte layer provided between the pair of electrode layers have a relative density of 80% or more.

* * * * *